US007939811B2

(12) United States Patent
Thundat et al.

(10) Patent No.: US 7,939,811 B2
(45) Date of Patent: May 10, 2011

(54) MICROSCALE FLUID TRANSPORT USING OPTICALLY CONTROLLED MARANGONI EFFECT

(75) Inventors: Thomas G Thundat, Knoxville, TN (US); Ali Passian, Knoxville, TN (US); Rubye H Farahi, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 958 days.

(21) Appl. No.: 11/778,162

(22) Filed: Jul. 16, 2007

(65) Prior Publication Data

US 2009/0020426 A1 Jan. 22, 2009

(51) Int. Cl.
*G01N 21/01* (2006.01)

(52) U.S. Cl. .................................... 250/432 R; 250/428

(58) Field of Classification Search ........................ None
See application file for complete search history.

(56) References Cited

U.S. PATENT DOCUMENTS

| | | | | |
|---|---|---|---|---|
| 5,858,801 | A * | 1/1999 | Brizzolara | 436/518 |
| 6,878,297 | B1 * | 4/2005 | Berger et al. | 216/17 |
| 7,033,476 | B2 | 4/2006 | Lee et al. | |
| 7,211,181 | B2 | 5/2007 | Thundat et al. | |
| 7,612,355 | B2 * | 11/2009 | Wu et al. | 250/559.04 |
| 2001/0041433 | A1 * | 11/2001 | Vekris et al. | 438/567 |
| 2004/0112529 | A1 * | 6/2004 | Karlsson et al. | 156/306.6 |
| 2005/0265648 | A1 * | 12/2005 | Roitman et al. | 385/12 |
| 2007/0207487 | A1 * | 9/2007 | Emig et al. | 435/6 |
| 2007/0241068 | A1 * | 10/2007 | Pamula et al. | 210/806 |
| 2007/0242105 | A1 * | 10/2007 | Srinivasan et al. | 347/63 |
| 2007/0242111 | A1 * | 10/2007 | Pamula et al. | 347/81 |
| 2007/0243634 | A1 * | 10/2007 | Pamula et al. | 436/518 |
| 2007/0275415 | A1 * | 11/2007 | Srinivasan et al. | 435/7.4 |
| 2007/0292976 | A1 * | 12/2007 | Clarysse et al. | 438/7 |
| 2008/0038810 | A1 * | 2/2008 | Pollack et al. | 435/283.1 |
| 2008/0053205 | A1 * | 3/2008 | Pollack et al. | 73/61.71 |
| 2009/0170186 | A1 * | 7/2009 | Wu et al. | 435/286.1 |

(Continued)

FOREIGN PATENT DOCUMENTS

WO 2005100541 A2 10/2005

OTHER PUBLICATIONS

Farahi, R.H., et al., "Microfluid~cM anipulation via Marangoni Forces," Applied Physics Letters, 2004, pp. 4237-4239, vol. 85, Issue 18.*

(Continued)

*Primary Examiner* — Bernard E Souw
*Assistant Examiner* — Andrew Smyth
(74) *Attorney, Agent, or Firm* — Brinks Hofer Gilson & Lione

(57) ABSTRACT

Low energy light illumination and either a doped semiconductor surface or a surface-plasmon supporting surface are used in combination for manipulating a fluid on the surface in the absence of any applied electric fields or flow channels. Precise control of fluid flow is achieved by applying focused or tightly collimated low energy light to the surface-fluid interface. In the first embodiment, with an appropriate dopant level in the semiconductor substrate, optically excited charge carriers are made to move to the surface when illuminated. In a second embodiment, with a thin-film noble metal surface on a dispersive substrate, optically excited surface plasmons are created for fluid manipulation. This electrode-less optical control of the Marangoni effect provides re-configurable manipulations of fluid flow, thereby paving the way for reprogrammable microfluidic devices.

58 Claims, 12 Drawing Sheets

U.S. PATENT DOCUMENTS

| | | | | |
|---|---|---|---|---|
| 2009/0213369 | A1* | 8/2009 | Lee et al. | 356/301 |
| 2009/0215192 | A1* | 8/2009 | Stolowitz et al. | 436/174 |
| 2009/0280475 | A1* | 11/2009 | Pollack et al. | 435/6 |
| 2009/0280476 | A1* | 11/2009 | Srinivasan et al. | 435/6 |
| 2009/0291433 | A1* | 11/2009 | Pollack et al. | 435/6 |

OTHER PUBLICATIONS

Passian, A., et al., "Probing Large Area Surface Plasmon Interference in Thin Metal Films Using Photon Scanning Tunneling Microscopy," Ultramicroscopy, 2004, pp. 429-436, vol. 100, Issue 3-4.*

Passian, A., et. al., Modulation of Multiple Photon Energies by Use of Surface Plasmons, Optics Letters, 2005, pp. 41-43, vol. 30.*

Farahi, R.H., et al., Marangoni Forces Created by Surface Plasrnon Decay, Optics Letters, 2005, pp. 616-618, vol. 30, Issue 6.*

Passian, A., et al., Nonradiative Surface Plasrnon Assisted MIcroscale Marangoni Forces, Physical Review E—Statistical, Nonlinear, and Soft Matter Physics, 2006, p. 06631 1, vol. 73, Issue 6.*

Farahi, R.H., et al., "Microscale Marangoni Actuation: All-Optical and All-Electrical Methods," Ultramicroscopy, 2006, pp. 815-821, vol. 106,Issue8-9.*

Aguirre, N. Munoz, et al., The Use of the Surface Plasmons Resonance Sensor in the Study of the Influence of "Allotropic" Cells on Water, Sensors and Actuators, B: Chemical, 2004, pp. 149-155, vol. 99.*

Meriaudeau, F., et al., "Fiber Optic Sensor Based on Gold Island Plasrnon Resonance," Sensors and Actuators, B: Chemical, 1999, pp. 106-117, vol. 54, Issue 1.*

Farahi, R.H., et al., "Microfluidic Manipulation via Marangoni Forces," Applied Physics Letters, 2004, pp. 4237-4239, vol. 85, Issue 18.

Passian, A., et al., "Probing Large Area Surface Plasmon Interference in Thin Metal Films Using Photon Scanning Tunneling Microscopy," Ultramicroscopy, 2004, pp. 429-436, vol. 100, Issue 3-4.

Passian, A., et. al., Modulation of Multiple Photon Energies by Use of Surface Plasmons, Optics Letters, 2005, pp. 41-43, vol. 30.

Farahi, R.H., et al., Marangoni Forces Created by Surface Plasmon Decay, Optics Letters, 2005, pp. 616-618, vol. 30, Issue 6.

Passian, A., et al., Nonradiative Surface Plasmon Assisted Microscale Marangoni Forces, Physical Review E—Statistical, Nonlinear, and Soft Matter Physics, 2006, p. 066311, vol. 73, Issue 6.

Farahi, R.H., et al., "Microscale Marangoni Actuation: All-Optical and All-Electrical Methods," Ultramicroscopy, 2006, pp. 815-821, vol. 106, Issue 8-9.

Aguirre, N. Munoz, et al., "The Use of the Surface Plasmons Resonance Sensor in the Study of the Influence of "Allotropic" cells on Water," Sensors and Actuators, B: Chemical, 2004, pp. 149-155, vol. 99.

Meriaudeau, F., et al., "Fiber Optic Sensor Based on Gold Island Plasmon Resonance," Sensors and Actuators, B: Chemical, 1999, pp. 106-117, vol. 54, Issue 1.

* cited by examiner

MICROSCALE FLUID TRANSPORT USING OPTICALLY CONTROLLED MARANGONI EFFECT

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC. The United States Government has certain rights in this invention.

BACKGROUND OF THE INVENTION

Precise control of fluid flow at the micrometer-scale (microscale) and nanometer-scale (nanoscale) level has enormous technological applications. For example, many recently developed microfluidic applications of chemical and biochemical analysis using lab-on-a-chip technology require the controlled flow of fluids at the microscale level. The burgeoning disciplines of genomics and proteomics demand a fast, efficient, and high throughput biomolecular separation technology that can be carried out on a chip format.

Microscale separation technologies typically employ microfluidic channels together with high voltages applied to built-in electrodes for movement of fluids on a substrate surface, such as those taught in U.S. Pat. No. 7,033,476, to Lee et al. on Apr. 25, 2006 and, U.S. Pat. No. 7,211,181 to Thundat et al., on May 1, 2007, and WO2005100541 A2 to the Univ. of California as published on Oct. 27, 2005. The use of a high voltage on a fluidic chip is one of the main disadvantages in the present-day practice of the microfluidic analysis using lab-on-a chip technology. Like microheaters, microfluidic channels cannot be reconfigured once they have been fabricated.

It is also known to manipulate a liquid on a surface by altering the temperature of the liquid. A temperature change effected at the interface between the surface and the liquid will move the liquid by the change in surface tension. For pure liquids, the surface tension decreases as a function of increasing temperature. Since surface tension has the dimensions of N/m (a force), any gradient in surface tension is a pressure. The pressure difference can cause substantial fluid transport due to the Marangoni effect.

These kinds of temperature changes are usually affected by microheaters constructed on a substrate surface. Microheaters make the device expensive to fabricate, and in addition, once they have been fabricated, the heaters cannot be reconfigured.

BRIEF SUMMARY OF THE INVENTION

The invention relates to a device and method for controlling the flow of fluids solely by optical means. The use of light and the ability to spatially control light allows fluid actuation at the microscale and nanoscale level by controlling the surface tension of the surface on which the fluid resides. More particularly, it relates to the use of low energy light illumination of such surface in combination with two approaches: 1) a specially doped semiconductor surface and 2) a surface plasmon supporting surface. Both approaches manipulate a fluid on a surface without the need for any applied electric fields, flow channels, or high energy light.

DETAILED DESCRIPTION OF THE INVENTION

Figure 1:
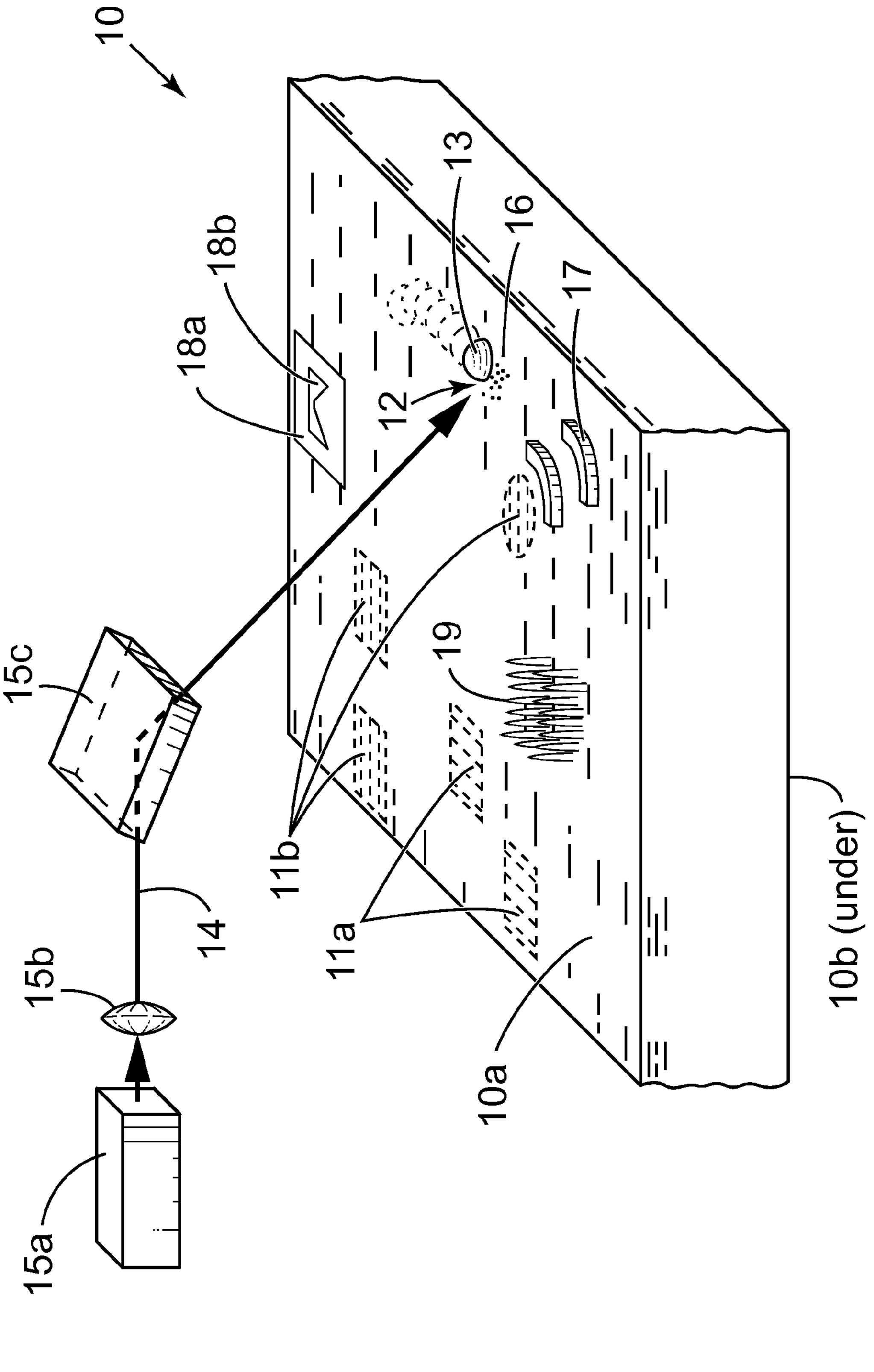
FIG. 1 is an illustration of the general operating principle of the invention. The figure also illustrates various embodiments of the invention.

In the invention, low energy light illumination and either a doped semiconductor surface or a surface-plasmon supporting surface are used in combination for manipulating a fluid on the surface in the absence of any applied electric fields or flow channels. Precise control of fluid flow is achieved by only applying focused or tightly collimated low energy light to the surface-fluid interface. In the first case, with an appropriate dopant level in the semiconductor substrate, optically excited charge carriers can be made to move to the surface when illuminated. The use of this localized illumination of the semiconductor-fluid interface creates charge carriers that are much localized. Localized variations in the surface charge density create localized variations in surface tension. Likewise, in the second case, with a thin-film noble metal surface on a dispersive substrate, optically excited surface plasmons can be created. The non-radiative decay of surface plasmons produces a localized temperature gradient that creates localized surface tension gradients. The invention thus brings about the well known Marangoni effect, but does it in two completely new and different manners. The gradient in the surface tension gives rise to physical forces that control the fluid flow. The new electrode-less optical control of the Marangoni effect provides re-configurable manipulations of fluid flow, thereby paving the way for reprogrammable microfluidic devices.

Unlike conventional fluidic devices where a microscale network of conduits is fabricated using lithographic techniques, the purely optical control of this invention makes possible a channel-less fluidics platform. Light may be used in any arbitrary fashion to create lines for confining the movement of the fluid on the surface. Also unlike many other methods, there is no need for high power lasers or light sources to create localized temperature variations in the fluid to produce fluid flow. Rather, low energy light is all that is needed to create localized electrical charge carriers in the semiconductor or to create localized heating in the surface plasmon supporting film for fluid movement and manipulation. In the case of the semiconductor surface, no rise in temperature occurs with this apparatus and method.

Various apparatus and methods for optical control of surface tension of a fluid on a semiconductor surface in accordance with this invention are now described. The first method utilizes a semiconductor surface that is doped in such a way that there exists a gradient in dopant concentration at or near the surface. When light is focused on the semiconductor-liquid interface, light generated charge carriers are drawn from the depletion layer where they alter the surface tension locally to make possible the manipulation of the liquid solely by the light illumination.

The following publications are related to the invention and are herein incorporated by reference in their entirety: 1) FARAHI, R. H., et al., "Microfluidic Manipulation via Marangoni Forces," Applied Physics Letters, 2004, pp. 4237-4239, Vol. 85, Issue 18; 2) PASSIAN, A., et al., "Probing Large Area Surface Plasmon Interference in Thin Metal Films Using Photon Scanning Tunneling Microscopy," Ultramicroscopy, 2004, pp. 429-436, Vol. 100, Issue 3-4; 3) PASSIAN, A., et. al., "Modulation of Multiple Photon Energies by Use of Surface Plasmons, Optics Letters, 2005, pp. 41-43, Vol. 30; 4) FARAHI, R. H., et al., "Marangoni Forces Created by Surface Plasmon Decay, Optics Letters, 2005, pp. 616-618, Vol. 30, Issue 6; 5) PASSIAN, A., et al., "Nonradiative Surface Plasmon Assisted Microscale Marangoni Forces, Physical Review E—Statistical, Nonlinear, and Soft Matter Physics, 2006, p. 066311, Vol. 73, Issue 6; 6) FARAHI, R. H., et al., "Microscale Marangoni Actuation: All-Optical and All-Electrical Methods," Ultramicroscopy, 2006, pp. 815-821, Vol. 106, Issue 8-9; 7) AGUIRRE, N. Munoz, et al., "The Use of the Surface Plasmons Resonance Sensor in the Study of the Influence of "Allotropic" Cells on Water," Sensors and Actuators, B: Chemical, 2004, pp. 149-155, Vol. 99; 8) MERIAUDEAU, F., et al., "Fiber Optic Sensor Based on Gold Island Plasmon Resonance," Sensors and Actuators, B: Chemical, 1999, pp. 106-117, Vol. 54, Issue 1.

Figure 2:
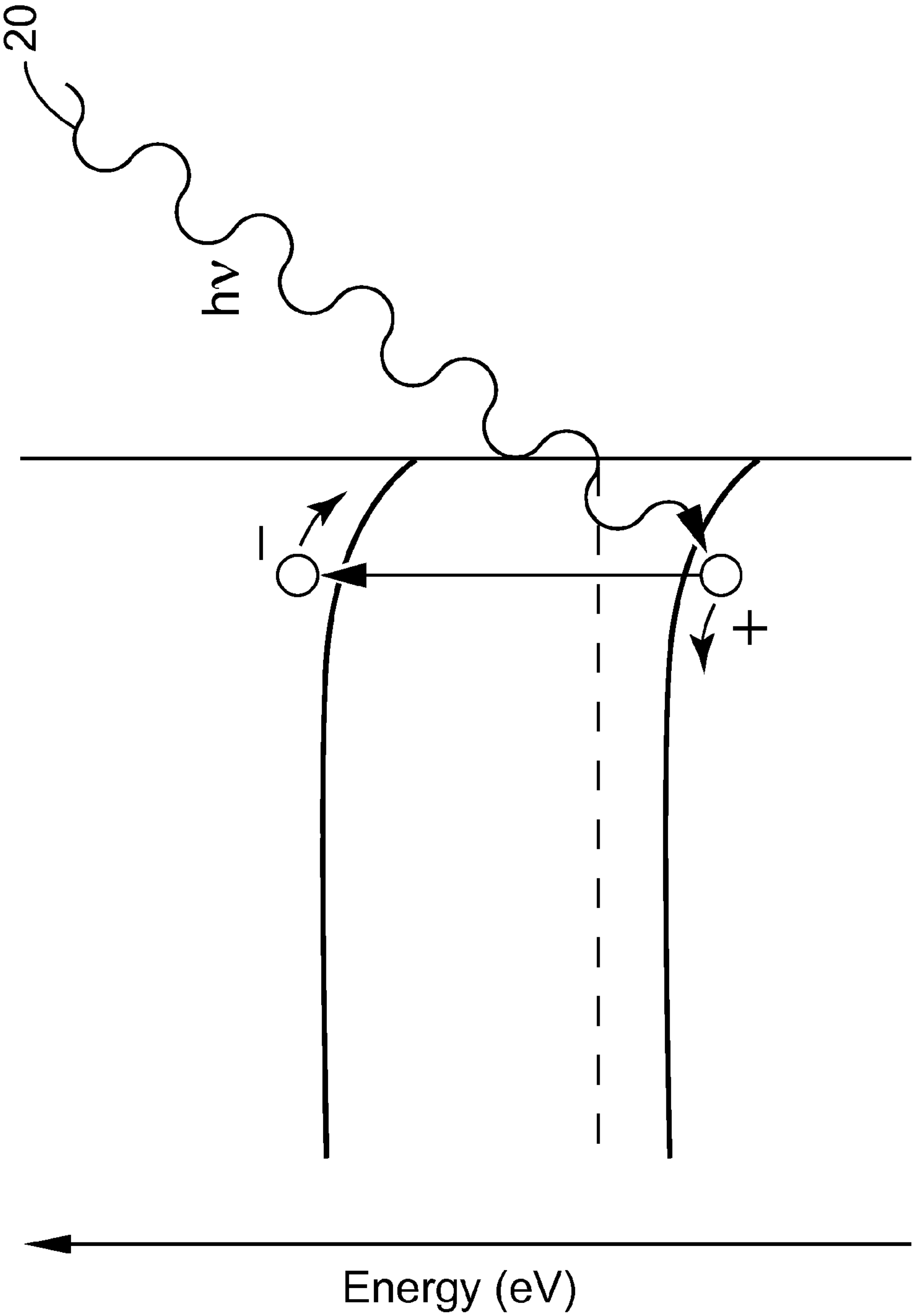
FIG. 2 is a band diagram illustrating the manner in which electrical charge carriers are brought to the semiconductor surface to effect fluid movement.
Figure 3:
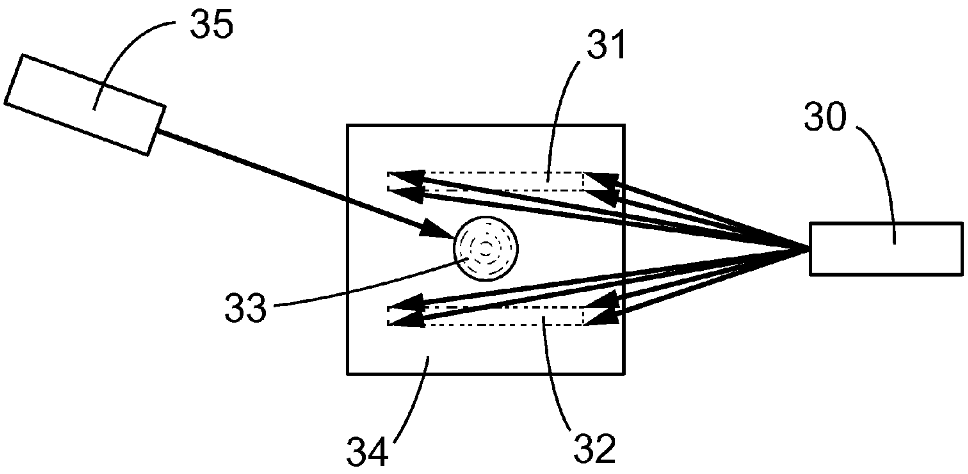
FIG. 3 illustrates an embodiment of the invention where artificial channel walls are created by a modulated or scanned light beam, and another light beam is used to push or pull a fluid on the semiconductor surface while keeping the fluid confined within the channel walls.
Figure 4:
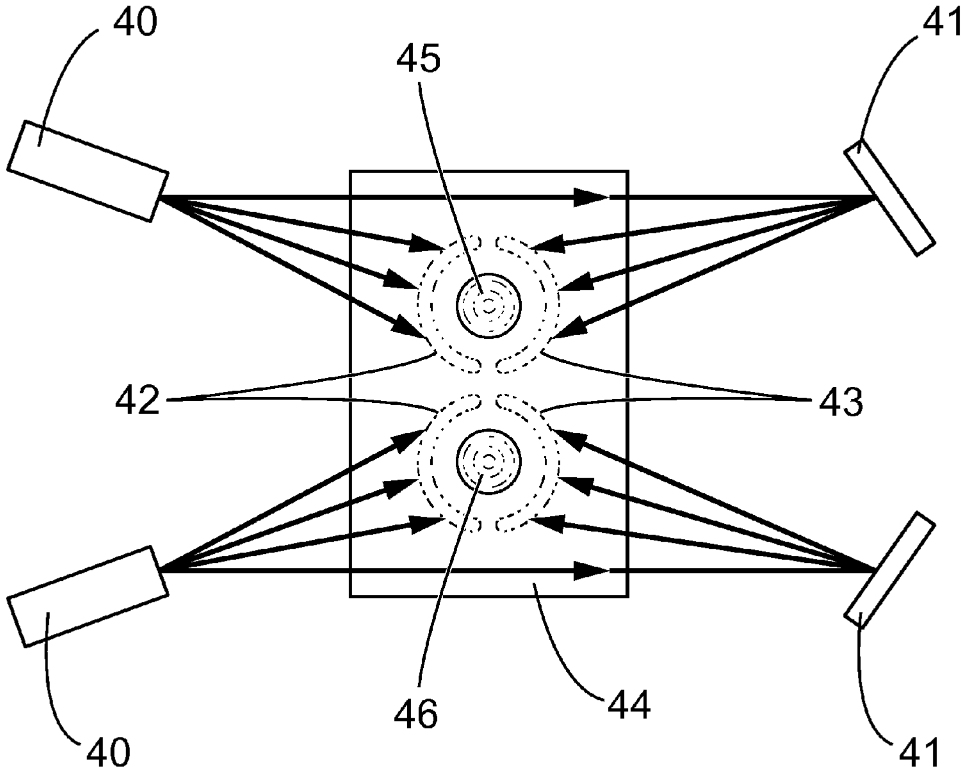
FIG. 4 illustrates another embodiment of the invention where a micro volume of a fluid is trapped, and/or concentrated, and also may be moved or merged on a doped semiconductor surface by means of one or two modulated or scanned light beams.
Figure 5:
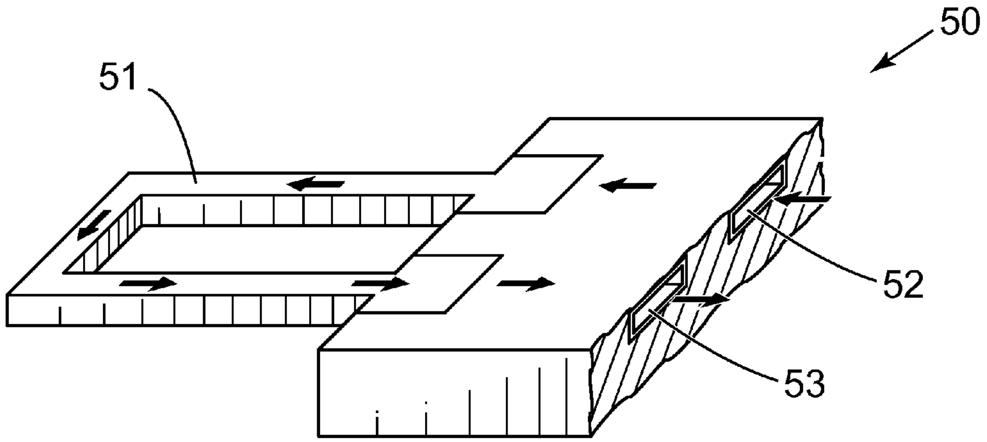
FIG. 5 illustrates a hollow cantilever embodiment of the invention.
Figure 6:
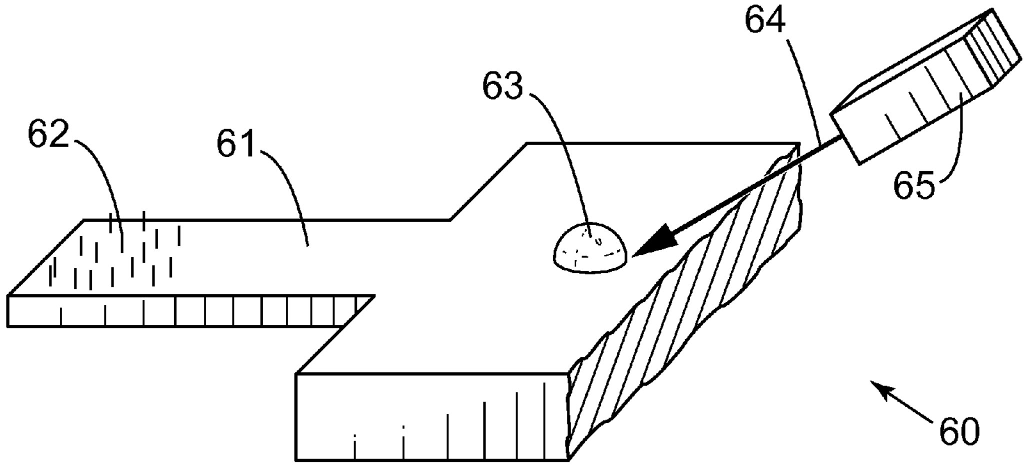
FIG. 6 illustrates a flat cantilever embodiment of the invention.
Figure 7:
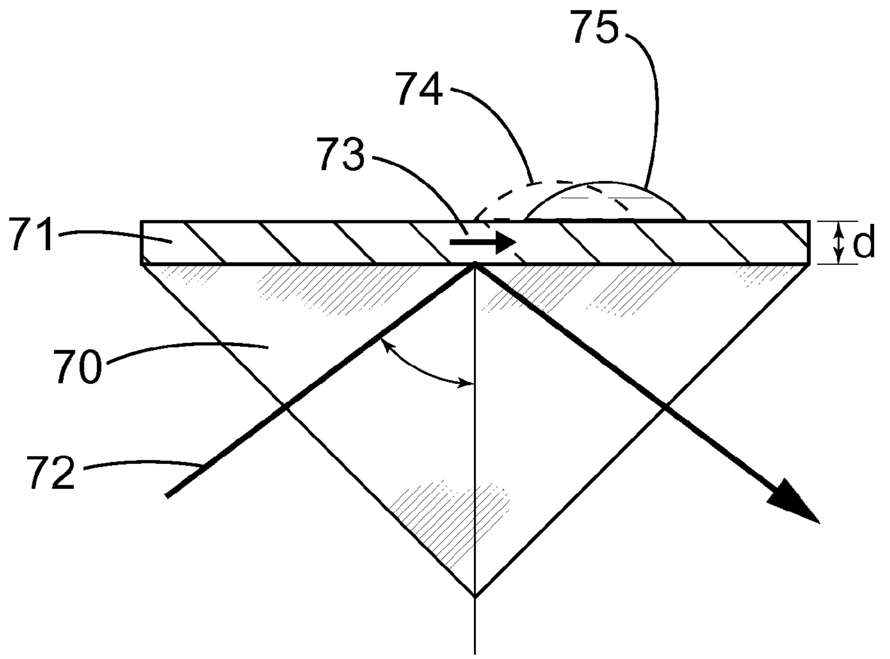
FIG. 7 illustrates the general method of the invention of using surface plasmons, created in a Kretschmann configuration, to actuate and sense fluids. The figure shows how a fluid may be transported by an actuating light beam.
Figure 8:
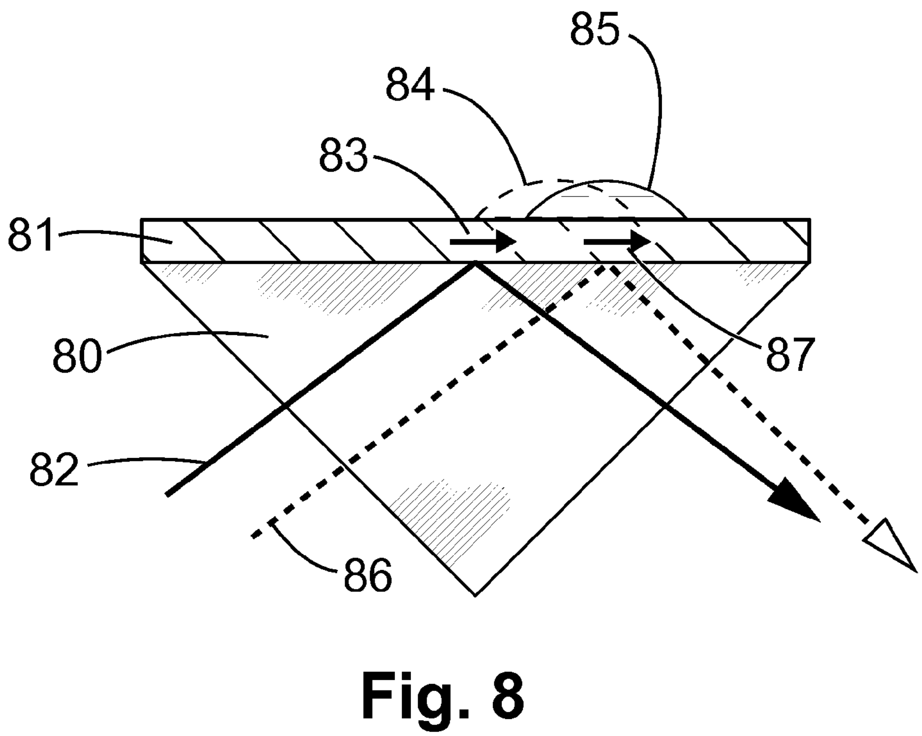
FIG. 8 illustrates an embodiment of the invention where fluid is transported by a surface plasmon actuating light beam and the surface conditions are being sensed by a secondary surface plasmon sensing light beam.
Figure 10:
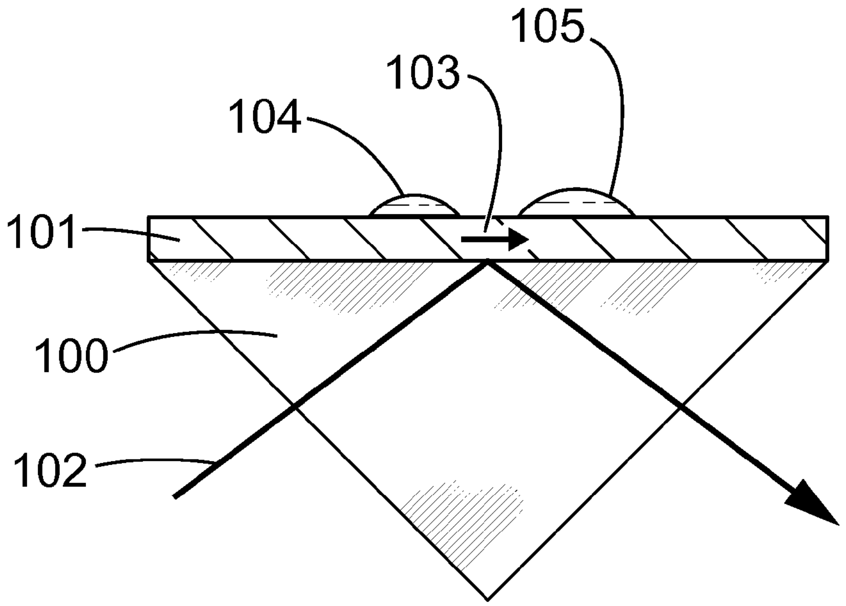
Figure 20:
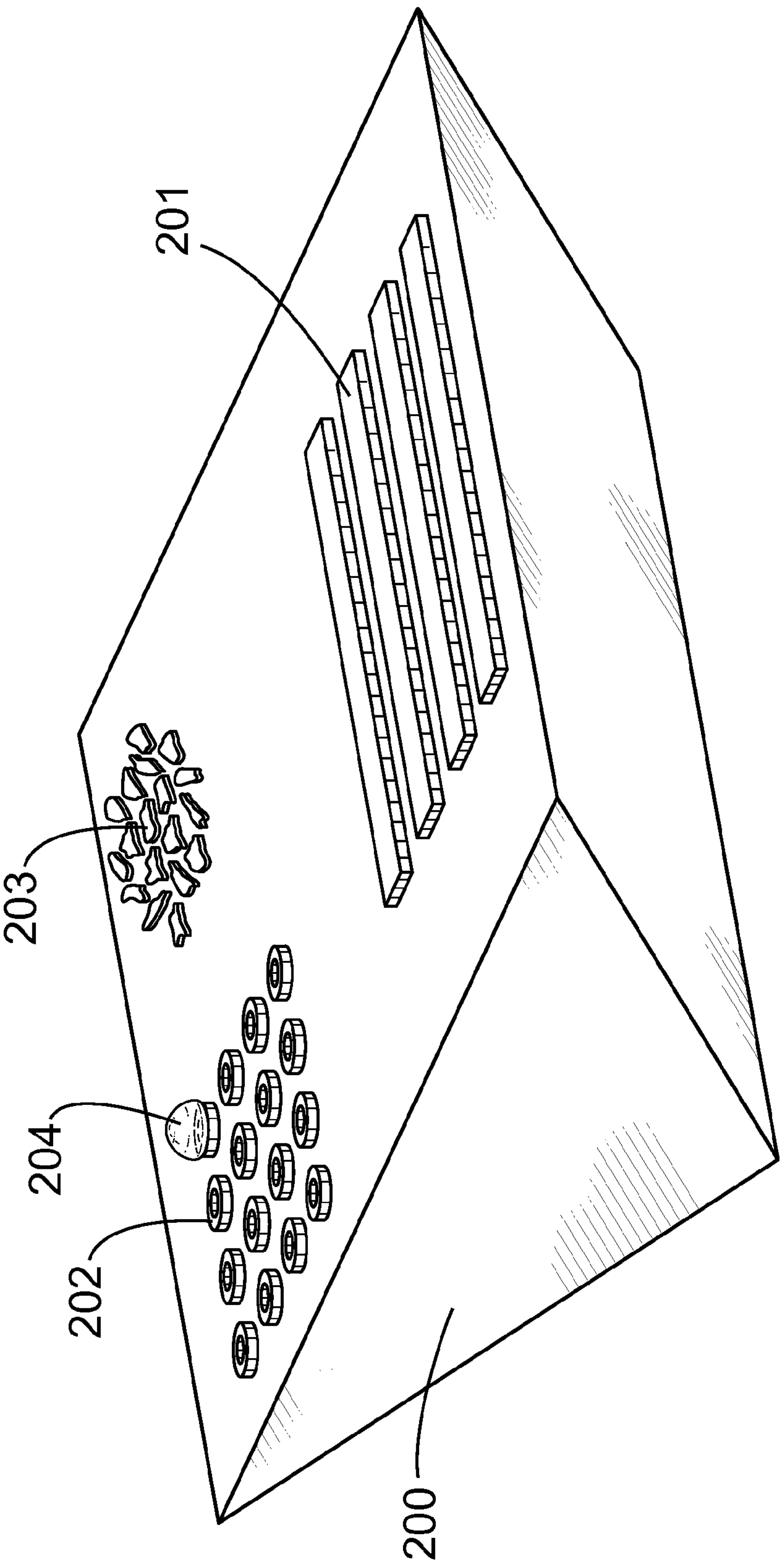
FIG. 20 illustrates another embodiment of this invention where a discontinuous surface plasmon supporting surface is patterned. The figure illustrates rings or toroids, nanometer-scale islands, and gratings.

The following structural element numbering applies to FIGS. 1-20 and the detailed description of this invention:

FIG. 1
10 semiconductor wafer
10*a* semiconductor surface
10*b* semiconductor backside
11*a* undoped surface regions
11*b* doped surface regions
12 interface region
13 fluid
14 light beam
15*a* low power laser
15*b* focusing lens
15*c* mirror modulator and/or scanner device
16 charge carriers
17 fluid flow channels
18*a* hydrophobic surface region
18*b* hydrophilic surface region
19 functionalized surface region FIG. 2
20 light beam FIG. 3
30 light source
31 artificial wall
32 artificial wall
33 fluid
34 doped semiconductor surface FIG. 4
40 light source
41 mirror modulator and/or scanner device
42 ring-shaped, artificial wall
43 ring-shaped, artificial wall
44 doped semiconductor surface
45 fluid
46 fluid FIG. 5
50 hollow cantilever
51 cantilever beam
52 fluid inlet
53 fluid outlet FIG. 6
60 flat cantilever
61 cantilever beam
62 functionalization with complimentary analytes
63 fluid
64 light beam
65 low power laser FIG. 7
70 prism
71 surface plasmon supporting surface
72 excitation light beam
73 surface plasmons
74 fluid at initial location
75 fluid at final location FIG. 8
80 prism
81 surface plasmon supporting surface
82 actuating light beam
83 surface plasmons for excitation
84 fluid at initial location
85 fluid at final location
86 sensing light beam
87 surface plasmons for sensing

FIG. 9

90 prism
91 surface plasmon supporting surface
92 actuating light beam
93 surface plasmons
94 fluid at initial location

FIG. 10

100 prism
101 surface plasmon supporting surface
102 actuating light beam
103 surface plasmons
104 fluid after split
105 fluid after split

FIG. 11

110 prism
111 surface plasmon supporting surface
112 actuating light beam
113 surface plasmons
114 fluid
115 probe beam source
116 position sensing detector

FIG. 12

120 prism
121 surface plasmon supporting surface
122 actuating light beam
123 surface plasmons
124 fluid
125 patterned hydrophobic or hydrophilic film

FIG. 13

130 prism
131 surface plasmon supporting surface
132 sensing and actuating light beam
133 surface plasmons
134 fluid of first type
135 fluid of second type

FIG. 14

140 prism
141 surface plasmon supporting surface
142 sensing and actuating light beam
143 surface plasmons
144 fluid of first type at final location
145 fluid of second type

FIG. 15

150 dielectric probe
151 surface plasmon supporting surface on probe
152 probe actuating light source
153 surface plasmons from dielectric probe
154 fluid
155 surface that may or may not support surface plasmons

FIG. 16

160 dielectric probe
161 surface plasmon supporting surface on probe
162 probe sensing and actuating light source
163 surface plasmons from dielectric probe
164 fluid
165 surface plasmon supporting surface on a prism (not shown)
166 sensing and actuating light beam
167 surface plasmons from sensing and actuating light beam

FIG. 17

170 prism
171 surface plasmon supporting surface
172 first excitation light beam, broadened and collimated
173 second excitation light beam, broadened and collimated
174 standing surface plasmons
175 intensity representation of standing surface plasmons
176 fluid

FIG. 18

180 prism
181 surface plasmon supporting surface
182 first excitation light beam, broadened and collimated
183 second excitation light beam, broadened and collimated
184 intensity representation of standing surface plasmons
185 standing surface plasmons
186 separated fluid grating

FIG. 19

190 prism
191 patterned surface plasmon supporting surface
192 patterned holes through the surface
193 patterned holes partially through the surface
194 gratings partially through the surface
195 fluid

FIG. 20

200 prism
201 patterned gratings
202 patterned toroids or rings
203 patterned nanometer-scale islands or nanometer-scale particles
204 fluid Referring to FIG. 1, a surface 10*a* of a semiconductor 10 is heavily doped compared to the other (back) side 10*b*. This is done in order to produce band bending on the doped surface 10*a*. The Fermi level is uniform across the thickness of the semiconductor. Therefore there is no need to apply a bias across the semiconductor surface. Localized illumination of the surface creates electron-hole pairs in the depletion region of the semiconductor. The electric field in the depletion layer separates the electron-hole pairs.

Referring to the band diagram in FIG. 2, depending on the choice of dopant valency (p-type or n-type), it is possible to bring either electrons or holes to the surface. It will be appreciated that once the dopant valency has been decided, a dopant is applied to the semiconductor that will produce the chosen valency. Thereafter, any light 20 illuminating the doped portion of the semiconductor surface will always bring only electrons (or holes) to the illuminated area from the depletion region. Since the surface tension depends only on the electric field in the depletion region and not on the direction of the field, the surface tension can be controllably changed by bringing positive (or negative) charges to the surface solely through the use of the light beam. However, the relative energy level with respect to the chemical potential of the liquid or species in the liquid will be different for holes and electrons.

In the example of FIG. 1, the interface region 12 between the semiconductor surface 10*a* and the liquid 13 is locally illuminated using a light beam 14 from a focused, low-power (milliwatt range) laser 15*a*. A light spot of 30 microns can be achieved very easily with available optics. By using focusing lenses 15*b*, it is possible to focus the beam spot to a few microns size. A mirror, modulator and/or scanner device 15*c* may also be used with the light beam. The electric field in the depletion region separates the electron-hole pairs created in the surface depletion region. The charge carriers 16 arriving at the surface 10*a* will spread. However, by using dispersed minority carrier lifetime killers (not shown), it is possible to control the spread. Minority carrier lifetime killers can be implanted atoms of gold. Gold nanoparticles dispersed on the surface 10*a* can also act as minority carrier lifetime killers. The spreading of the electron-hole pairs can also be prevented by making the semiconductor low grade. Another way is to use rapid heat treatment of the semiconductor.

In the doping process, it is very important to have the depletion layer only on the surface 10*a*. The doping profile should be such that the surface 10*a* of the semiconductor 10 is heavily doped. This may be accomplished on a silicon wafer, for example, by heating the wafer close to 1100° C. in the presence of boron nitride wafers. The back side 10*b* of the wafer 10 should be masked to avoid boron diffusion into the wafer from both sides. The diffusion profile will be a complimentary error function.

Selective doping of the surface 10*a* is a feature of the invention. For example, in FIG. 1, surface regions 11*a* are not doped, whereas regions 11*b* are doped. Such selective doping can be accomplished using an ion implantation technique, for example. If a selectively doped surface is used, the light beam 14 will only be able to move the liquid 13 where the dopant is present, not in any undoped regions. It is also possible to use ordinary solar cells with the metal fingers removed by acid etch.

Further in the embodiment of FIG. 1, a light source 15*a*, which can be a low power laser 15*a* with photon energy higher than the band gap of the semiconductor, is used to illuminate the semiconductor-liquid interface region 12. If the charge carriers 16 are such that they act to decrease the surface tension at the illuminated region 12, then the liquid 13 will move away from the illuminated region. Movement of the light beam causes the fluid to move in the direction of the light beam. The effect is like pushing or pulling the liquid, depending on the valency of the charge carriers. In order to achieve fluid flow, movement of the liquid 13 in 360 degrees should be prevented. For example, the semiconductor could have pre-fabricated channels 17 on the surface that allow fluid flow only through the channel. The walls of the channel 17 confine the fluid allowing movement only within the channel. Another way to accomplish fluid flow is by patterning the doped surface into hydrophobic 18*a* and hydrophilic 18*b* regions. The hydrophobic regions 18*a* act to confine the liquid 13 while the hydrophilic 18*b* regions provide an avenue for liquid movement.

If the entire semiconductor surface has been doped, movement of the liquid 13 over the entire surface 10*a* can be accomplished. The mirror, modulator and/or scanner 15*c* can be used to modulate the light beam 14 to produce a pulsed variation in the surface tension. If the light source 15*a* and mirror modulator scanner 15*c* are arranged to produce alternate stripes of dark and illuminated regions on the surface 10*a*, then a striped change in surface tension will be achieved. The liquid 13 will move from the lower surface tension region toward the higher surface tension region. By interchanging the illuminated and dark regions, the liquid 13 will move back to original position. If the illumination is scanned over a small distance, fluid flow will be accomplished. The fluid flow can be arranged in any pattern by different manipulations of the scanned light 14.

In the embodiment of FIG. 3, a light beam from a source 30 is patterned to form artificial walls 31, 32 that act as a trough for routing the fluid 33 on the doped semiconductor surface 34. The lower surface tension on the walls confines the liquid within the walls. The light can be directed to form microfluidic lines of any desired pattern or shape. A beam from another light source 35, or a second beam of light from the same source, moves the trapped fluid within the artificial walls 31, 32. Such walls can be created by constant, patterned illumination or by fast rastering of the light from the source 30.

In the embodiment of FIG. 4, the light beam is patterned differently. One light source 40 and mirror modulator scanner 41 can be operated to produce ring-shaped lines or artificial walls 42, 43 on a doped semiconductor surface 44 that trap a fluid 45, 46. Such as small amount of confined fluid may then be moved about the doped semiconductor surface in any direction by the illumination.

In the embodiment of FIG. 4, an analyte volume on a doped semiconductor surface can be concentrated by changing the radius of the annular ring of illumination.

FIG. 4 also illustrates that two trapped fluid volumes created by two different annular illuminations can be merged to form chemical reactions.

The light beam can also be adjusted such that there exists a gradient in the light intensity. Variation in light intensity creates gradient in surface tension and thus a pressure in the fluid which also can be used to cause the fluid to flow on the surface.

From these examples, patterning the light is seen to play a major role in controlling the fluid flow.

In addition to the selective doping described earlier, it is also possible to vary the dopant profile to produce a variation in the charge carrier density in any particular doped surface region. Such variable features together with the light beam patterning makes it possible to create a wide variety of fluid flow patterns and/or effects on the semiconductor surface.

FIG. 1 illustrates a still further embodiment of the invention. Certain regions 19 of the doped semiconductor surface may be functionalized using complimentary chemicals (for example, DNA or proteins), and the analytes can be guided onto regions such as region 19 for possible chemical interactions.

In additional embodiments of the invention, the fluidic concepts described above can be coupled with a hollow cantilever detection technique. In FIG. 5, for example, the analyte of interest may be moved into cantilever 50 with a hollow arm 51 by the invention. The analyte would travel through the cantilever through entrance 52 and exit 53 points. The resonance frequency of the cantilever arm 51 might then change with changes in the mass loading, for example.

Similarly, in FIG. 6, a flat cantilever 60 has been modified using complimentary analytes 62 on the arm 61. The fluid 63 may be moved to the cantilever arm 61 for analyte interaction, for example. The resonance frequency of the cantilever may be monitored using techniques such as optical beam deflection 64, 65, piezoresistance or piezoelectricity. Fluorescently labeled analytes may also be used with the microcantilever and other embodiments of this invention.

Various apparatus and methods for optical control of surface tension of a fluid on a surface-plasmon supporting surface in accordance with this invention are now described. The method creates surface plasmons on a thin film noble metal by optical excitation using the Kretschmann configuration, a well-known geometry to those familiar in the state-of-the-art in surface plasmon resonance (SPR). What is not obvious to those familiar in the state-of-the-art is that surface plasmons locally alter the surface tension of liquid disposed on the thin film surface that make possible the fluidic manipulation solely by the excitation of light.

Referring to FIG. 7, a Kretschmann configuration is used to actuate fluids, where a thin film noble metal 71 of thickness d is coated on a flat side of a right angle prism 70 made of a dielectric medium. A collimated p-polarized laser light 72 impinges the prism at a precise angle $\theta_c$ and reaches the thin film 71 where it excites surface plasmons 73, and then reflects from the thin film. The conditions for optimal surface plasmon creation and minimal reflection depend on a number of parameters well-known to those familiar in the state-of-the-art in SPR. These parameters include the wavelength of the incident light, angle of incidence, material properties and thickness of the film, dielectric properties directly above and below the thin film, and surface roughness. The excited surface plasmons 73 eventually decay through radiative and nonradiative (thermal, acoustic) channels due to surface roughness, impurities, and damping. The nonradiative decay of surface plasmons produce a temperature gradient on the thin film which results in a surface tension gradient. This effect is great enough to be utilized for surface-tension-driven flows of fluids 74, 75 on a surface 71. When the region of excited surface plasmons is placed in close proximity or underneath the liquid 74, the liquid 74 recedes across the surface to a new position 75. The high efficiency of the optical coupling allows a sufficient localized temperature gradient to actuate liquid with low intensity light 72. The actuating light beam 72 is collimated and slightly focused to produce a region of surface plasmons 73 with dimensions on the order of the desired liquid actuation, where micrometer and nanometer scale dimensions may be easily achieved. By controlling the size, shape, intensity, modulation and location of the excitation light 72, the region of surface plasmons 73 may be readily directed in order to actuate a body of liquid 74.

This device enables a method for moving the fluid on a surface by disposing the fluid on the surface of a thin-film noble metal surface that is attached to a dispersive substrate. By focusing at least one programmable light beam on the metal surface proximate the fluid, the light beam creates surface plasmons in the metal surface resulting in surface tension changes for moving the fluid on the metal surface.

Referring to FIG. 8, in another embodiment the Kretschmann configuration 80, 81, 82 is augmented by an additional excitation source 86 that is arranged as an Surface Plasmon Resonance (SPR) probe for sensing any changes in parameters that affect its resonance condition. In particular, changes in the surface and liquid 84 on the surface may be detected. The use of SPR for sensing is well known to those familiar in the state-of-the-art in SPR. In contrast to the actuating light beam 82 that creates surface plasmons 83 for fluid manipulation, the sensing light beam 86 may be configured so that is does not actuate the liquid 84 85 yet create surface plasmons 87 for sensing the fluid 84, 85 and surface conditions. For example, this may be achieved by using a light beam of lower intensity or different wavelength. Thus, with the same configuration, multiple optical beams 82, 86 may be simultaneously used and interchanged for the actuation and sensing of fluids, especially on the micrometer scale.

Figure 9:
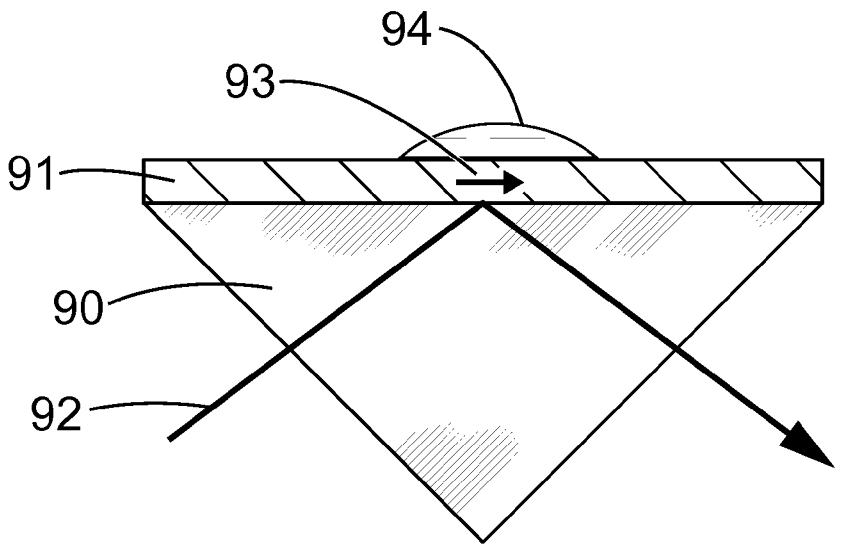
FIGS. 9 and 10 illustrate a method of subdividing or splitting a fluid, where the surface plasmon actuating light beam is placed under the fluid.

Referring to FIG. 9 and FIG. 10, the application of subdividing or splitting liquid is demonstrated in the Kretschmann configurations 90, 91, 92, 100, 101, 102 where an excitation beam 92, 102 creates surface plasmons 93, 103 on a thin metal film 91, 101 on a right-angle dielectric prism 90, 100. A small region of surface plasmons 93, 103 is created and placed underneath a liquid 94 where it locally changes the surface tension of the liquid 94. As a result, the liquid will break into two or more parts 104, 105 as it to recedes from the localized heat source 93, 103.

Figure 11:
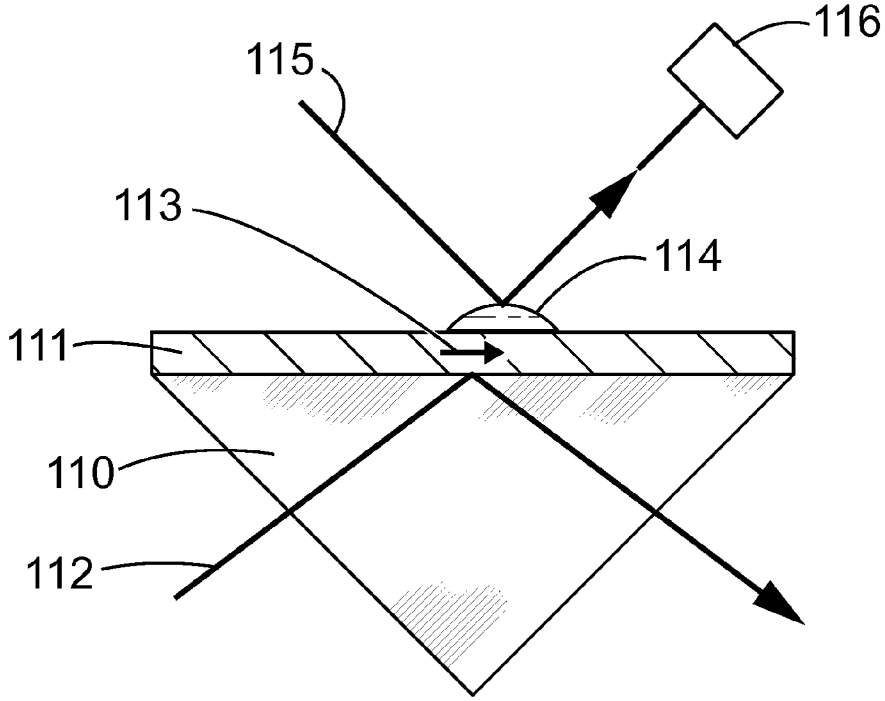
FIG. 11 illustrates another embodiment and method that incorporates an optical beam deflection probe with the Kretschmann configuration, in order to sense the fluid and surface conditions by optical beam deflection.

Referring to FIG. 11, another Kretschmann embodiment 110, 111, 112 includes an additional optical probe beam 115 that deflects off the open surface of the liquid 114 into a position sensing detector (PSD) 116 to monitor morphological changes in the liquid 114 due to the surface tension disturbances created by the surface plasmons 113. When the excitation beam 112 is configured so that it perturbs the liquid 114 with surface plasmons 113 without transporting it, the oscillation eigenmodes of the liquid 114 may be measured by the PSD 116. This actuation and sensing method, also known as a pump-probe method, may be used to identify liquids and species within a liquid. Furthermore, the embodiment of FIG. 11 may be applied to light-by-light communications for modulation and switching. Information carried by the excitation beam 112 is translated to the movement of the liquid 114 which is then encoded by the deflecting beam 115.

Figure 12:
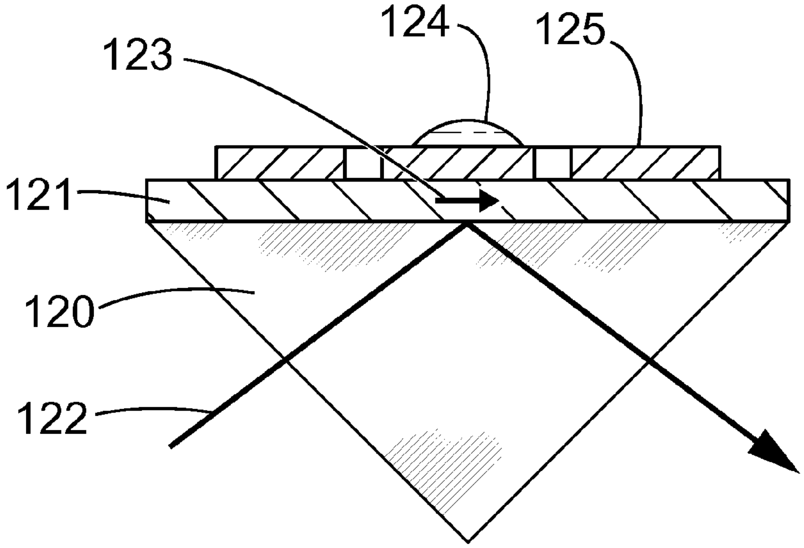
FIG. 12 illustrates another embodiment and method that uses an additional patterned hydrophobic or hydrophilic film on top of the surface plasmon supporting surface of the Kretschmann configuration.

In FIG. 12, a hydrophilic/hydrophobic patterned film 125 is applied to the metal film 121 of a Kretschmann configuration 120, 121, 122 to confine the fluid 124 flow in addition to the actuation and confinement via surface plasmons 123.

Figure 13:
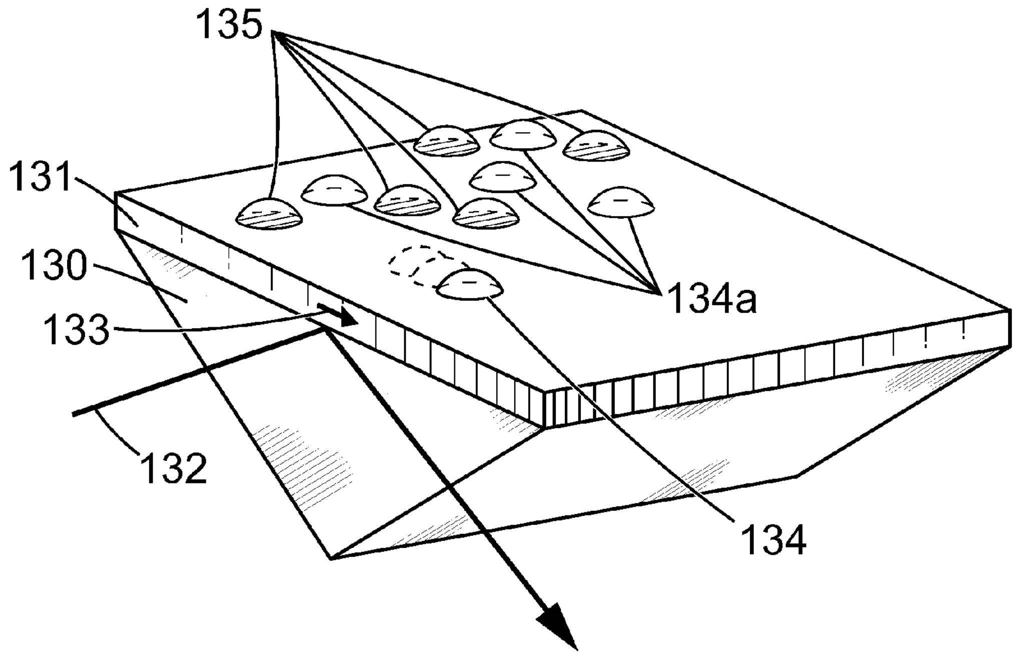
FIGS. 13 and 14 illustrate a method of sorting of unlike fluids by using the light beam as both an actuator and a sensor.
Figure 14:
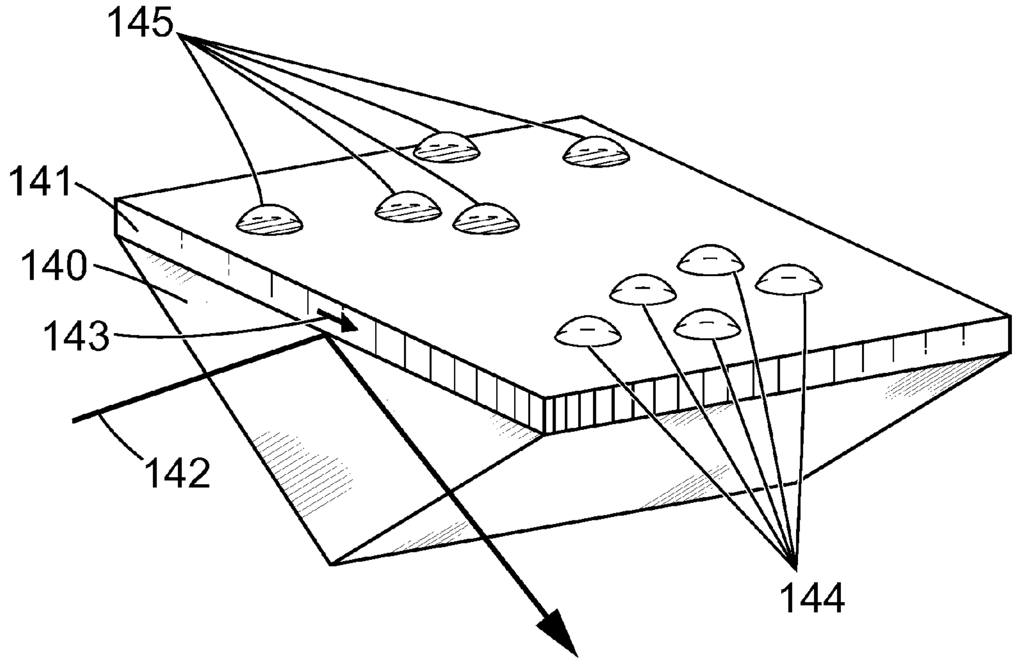

Referring to FIG. 13 and FIG. 14, the application of separating liquids is demonstrated on a Kretschmann configuration 130, 131, 132, 140, 141, 142. A particular fluid body 134*a* may be targeted from the rest of the fluid bodies 134, 135 and easily re-located by surface plasmons 133, 143, thereby allowing the separation of particular microdroplets for further analysis or processing, detailed in FIG. 13. Alternatively, fluids 134*a*, 134, 135, 144, 145 may be pushed together to coalesce into a larger body of fluid, thereby allowing the concentration of minute fluid quantities over a large area (not shown).

In FIG. 13 and FIG. 14, different fluids 134*a*, 134, 135, 144, 145 that may be indistinguishable by visual inspection or by other means may be sorted. One liquid droplet 134*a*, 134, 144 may be distinguished from another 135, 145 by its optical and liquid properties, such as index of refraction, surface tension, viscosity, vaporization point, and contact angle. An excitation beam 132, 142 may be tuned or calibrated to transport one type of droplet but not the other. For example, each type of droplet has a minimum power level that it requires for transport. The power level of the excitation laser 132, 142 may be set low enough to be able to move only one type of droplet. When each droplet 134*a*, 134, 135, 144, 145 is interrogated by the surface plasmon region 133, 143, only one type of droplet 134*a*, 134, 144 will be repositioned, thereby the separation and sorting of different fluids is possible.

Figure 15:
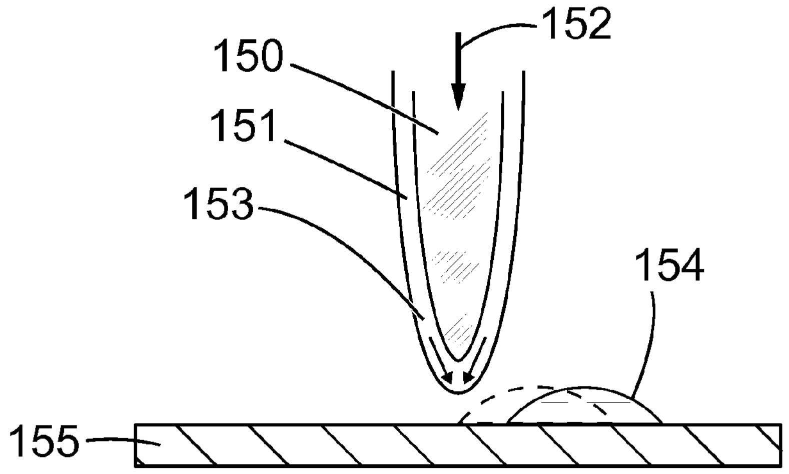
FIG. 15 illustrates another embodiment and method that uses a surface plasmon activated dielectric probe for fluid actuating and sensing instead of using the Kretschmann configuration.
Figure 16:
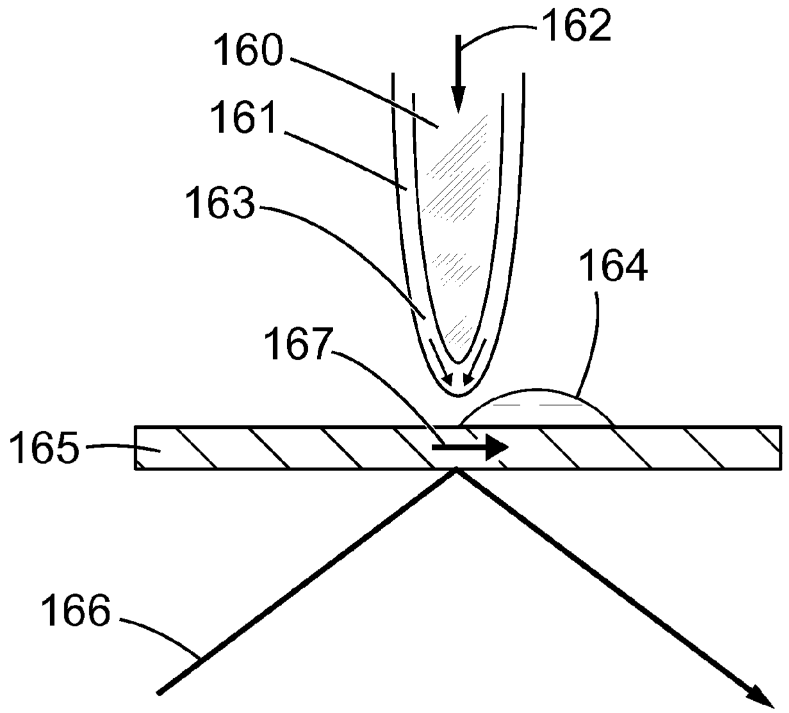
FIG. 16 illustrates another embodiment and method that uses a surface plasmon activated dielectric probe for fluid actuating and sensing in combination with a Kretschmann configuration for fluid actuating and sensing.

Referring to FIG. 15 and FIG. 16, other embodiments use an optical fiber 150, 160 that is coated with a metal thin film 151, 161 which supports surface plasmons 153, 163. The surface 155 in FIG. 15 does not necessarily support surface plasmons whereas the surface 165 in FIG. 16 is a surface plasmon supporting surface disposed in a Kretschmann configuration (not shown). The optical fiber 150, 160 may serve as both an actuator and a probe of a liquid 154, 164. When light 152, 162 is launched through the dielectric fiber 150, 160, surface plasmons 153, 163 are created at the fiber tip and can be used to actuate a body of liquid 154, 164. Alternatively, the fiber 150, 160 may act as a probe to detect an evanescent field at the liquid-air interface created by a secondary surface plasmon region 167 from a second light source 166, shown in FIG. 16, such that tunneled photons may be measured by a photomultiplier tube or an avalanche photodiode (not shown). Thus the creation of surface plasmons 153, 163, 167 from both the fiber 150, 160 and the secondary source 166 may be used interchangeably for both actuation and sensing. The use of metal coated and uncoated fibers as SPR probes is well known to those familiar in the state-of-the-art in SPR. What is not obvious to those familiar with the state-of-the art is that the decay of surface plasmons at the tip creates a localized heat source that, when positioned in proximity to a liquid, can induce surface tension driven flows of a liquid.

Figure 17:
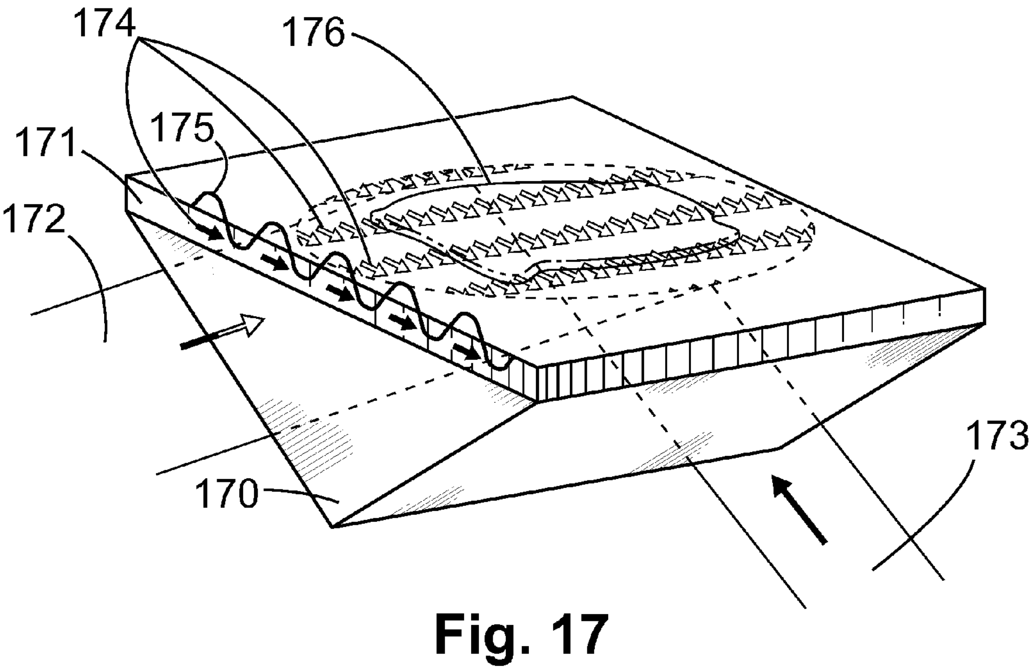
FIG. 17 illustrates a method that uses standing surface plasmons to actuate and confine fluids.
Figure 18:
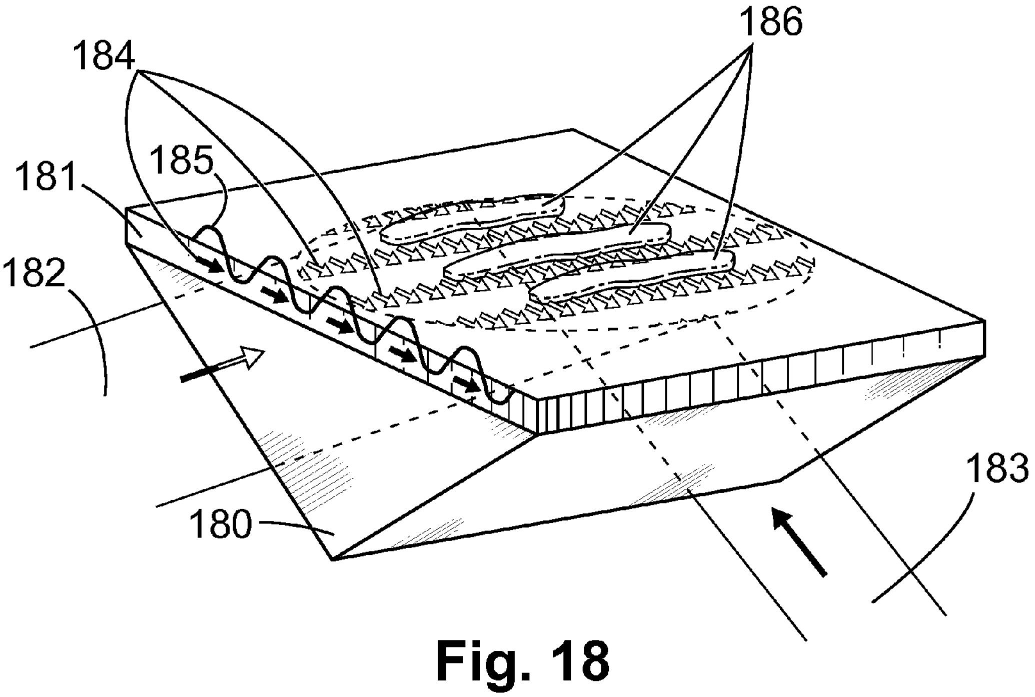
FIG. 18 illustrates the result of confining and arranging fluids in columns or gratings by the method of standing surface plasmons.

The illustrations in FIG. 17 and FIG. 18 show yet another embodiment in a Kretschmann configuration 170, 171, 172, 180, 181, 182 where two expanded, collimated excitation beams 172, 173 combine on the same region of the metal film 171, 181 in order to create large area standing surface plasmon interference fringes 174, 184. The modulated intensity of the light interference 175, 185 is schematically profiled. The establishment of this modulated region of surface plasmons 174, 184 is a consequence of the particle-wave duality of light and is well known to those familiar in the state-of-the-art in SPR and optics. What is not obvious to those familiar in the state-of-the-art is that these fringes 174, 184 also create the same pattern of surface tension gradients that can separate and confine a liquid into columns.

In FIG. 17 and FIG. 18, the liquid 176 is separated according to the created pattern 174, 184 of surface tension gradients. Nano-fluidic actuation and confinement is possible since the periodicity 175, 185 of the interference pattern 174, 184 is on the order of the excitation 172, 173, 182, 183 wavelength. Moreover, a second set of beams (not shown), positioned orthogonally to the first set, will produce confinement in both directions, creating a two dimensional array of droplets on the surface.

In FIG. 17 and FIG. 18, the interference fringes 174, 184 serve to create virtual confinement walls or troughs. A third actuating beam (not shown) may be used to transport a droplets (not shown) along a trough created by the interference fringes.

Figure 19:
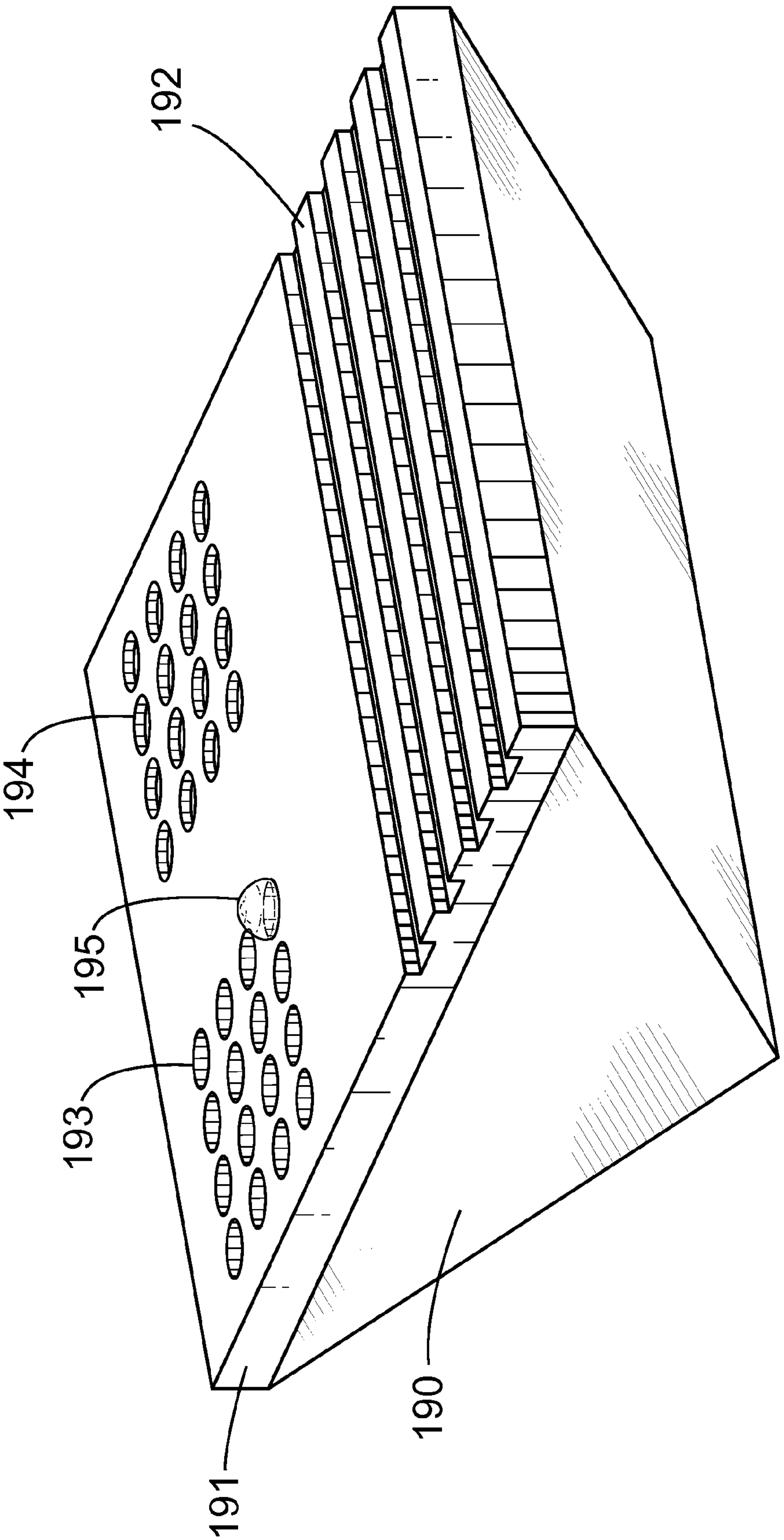
FIG. 19 illustrates another embodiment of this invention where a continuous surface plasmon supporting surface is patterned. The figure illustrates shallow and through holes, and shallow gratings.

Additional embodiments are illustrated in FIGS. 19 and 20, where various modifications of the metal thin film 191, 201, 202, 203 that support surface plasmons on a Kretschmann configuration 190, 200 (light and surface plasmons not shown) may be used to manipulate and confine fluids 195, 204.

In FIG. 19, the metal thin film may be patterned with holes that sink entirely through the film 193 or shallow holes (indentions) that are not as deep as the film 194. Likewise, any patterns, such as parallel lines 192 for example, may be used in conjunction with surface plasmons to manipulate fluids. The optimum surface plasmon creation may be tuned to a particular film thickness so that changes in surface tension will be governed by the changes in metal film 191 thickness. Thus surface tension patterns may be created with a broad excitation beam under a patterned surface 191.

In FIG. 20, the surface plasmon supporting surface may take on various embodiments, including gratings 201, an array of toroids 202, a metal island film 203, and nanometer-scale particles (nanoparticles) by colloidal formation or patterning 203. Upon impingement with a light source (not shown) surface plasmons will exist only where the metal film 201, 202, 203 exists, thereby creating localized surface tension gradients even with a large area light source. A particular useful embodiment is that these nanometer-scale structures 201, 202, 203, especially the metal island film and nanoparticles 203, will support surface plasmon creation with a direct light source from above and does not require a Kretschmann configuration for surface plasmon creation. Furthermore, nanoparticles 203 may be embedded in a sub-surface region near the surface which, upon optical excitation of surface plasmons in the nanoparticles, will produce a surface tension gradient sufficient to actuate fluids on the surface. In addition, nanoparticles 203 may be added to or dispersed within a hydrophilic/hydrophobic patterned film 125, shown in FIG. 12. The optical excitation of surface plasmons of the nanoparticles 203 in the hydrophilic/hydrophobic layer 125 will produce surface tension gradients that make possible the actuation of fluids on the hydrophilic/hydrophobic layer 125.

Combinations containing the Kretschmann configuration and a plurality of additional actuation and probe light sources, dielectric probes, optical beam deflection probes, patterned hydrophobic/hydrophilic films, and patterned metal surfaces are also embodiments of this invention.

None of the embodiments of the invention use external power to bias the semiconductor or the surface plasmon supporting surface. No electrodes are used, and no high voltages or potentials need to be applied to the device. Also there is no need for patterning hydrophilic/hydrophobic surfaces for confining the flow, although these may be incorporated if desired. No electrical power is required to creating band bending in the semiconductor. This is a unique method of achieving microscale fluid flow in a compact package. The methods are very simple and easy to practice. The methods use light to create surface tension gradients on the surface that actuate the fluids. The consequence is that many advantages particularly associated with the nature light can be leveraged.

Because the methods use light, the fabricated fluidic confinement is completely reprogrammable. Fluidic lines of any arbitrary shape can be made using light. Artificial walls by patterning surface tension gradients may be created by rapidly scanning or rastering a point excitation beam or by applying a non-moving patterned excitation source. Additionally, sub-micrometer patterns may be constructed by the interference of two or more light sources. The fluidic confinement can result in artificial walls of sub-wavelength periodicity that may be used to create columns of fluids or arrays of droplets. And, a gradient in light intensity will create a surface tension gradient within the illumination region itself for further control of the fluids.

The use of surface plasmons also allows the simultaneous sensing of the fluids and/or the surface conditions found in the powerful SPR characterization. This method of optically controlling fluid flow at the microscale level described herein provides unprecedented opportunities for the construction of microscale and nanoscale devices utilizing fluidic flow. One can use the technique for Lamb waves or Love wave sensors, flexural plate waves, for chemical and biological detection, online process monitoring, medical diagnostics, and other applications.

While there has been shown and described what are at present considered the preferred embodiments of the invention, it will be obvious to those skilled in the art that various changes and modifications can be made therein without departing from the scope.

We claim:

1. An apparatus for moving a fluid on a semiconductor surface, the apparatus comprising:

a semiconductor having a doped surface comprising a dopant; the dopant producing band bending at said surface; and a programmable light source for impinging a light beam on an interface between said doped surface and a fluid disposed on said doped surface, said light beam creating charge carriers in said doped surface resulting in surface tension changes capable of moving the fluid on said doped surface.

2. The apparatus of claim 1 wherein said semiconductor comprises silicon.

3. The apparatus of claim 1 wherein said dopant comprises boron nitride.

4. The apparatus of claim 1 wherein a concentration of said dopant varies thereby forming a concentration gradient.

5. The apparatus of claim 1 wherein said light beam is low energy light.

6. The apparatus of claim 1 wherein said dopant comprises a dopant valency selected to produce electrons.

7. The apparatus of claim 1 wherein said dopant comprises a dopant valency selected to produce holes.

8. The apparatus of claim 1 further comprising at least one device selected from the group consisting of focusing lens, mirror, modulator, and scanning device disposed between the light source and the semiconductor.

9. The apparatus of claim 1 wherein the doped surface of the semiconductor further comprises minority carrier lifetime killers.

10. The apparatus of claim 9 wherein said minority carrier lifetime killers comprise gold.

11. The apparatus of claim 1 wherein the doped surface is selectively doped, the dopant being present in one or more discrete regions of the surface.

12. The apparatus of claim 1 wherein said light source comprises a low power laser having photon energy higher than a band gap of said semiconductor.

13. The apparatus of claim 1 further comprising at least one of a hydrophobic region and a hydrophilic region on the doped surface.

14. The apparatus of claim 1 further comprising artificial walls defined on the doped surface by the light beam.

15. The apparatus of claim 14 further comprising a second light source for supplying a second light beam to move said fluid confined by said artificial walls.

16. The apparatus of claim 14 wherein said artificial walls are ring-shaped.

17. The apparatus of claim 16 wherein a radius of said ring-shaped artificial walls is adjustable.

18. The apparatus of claim 1 wherein the light beam comprises a variable intensity, thereby creating a surface tension gradient.

19. The apparatus of claim 1 wherein the doped surface further comprises functionalized regions.

20. The apparatus of claim 19 wherein said functionalized regions further comprise analytes for sensing DNA and proteins.

21. The apparatus of claim 20 wherein said analytes are fluorescently labeled.

22. The apparatus of claim 19 wherein said functionalized regions are formed in a hollow cantilever.

23. The apparatus of claim 19 wherein said functionalized regions are formed on a cantilever arm surface.

24. An apparatus for moving a fluid on a surface, the apparatus comprising:

an optical fiber actuator comprising a metal film disposed thereon, a substrate for supporting a fluid disposed adjacent to the optical fiber actuator; and a programmable light source in communication with the optical fiber actuator for passing a light beam therethrough to impinge on the metal film, the light beam creating surface plasmons in the metal film resulting in surface tension changes capable of moving a fluid disposed on the substrate.

25. The apparatus of claim 24 wherein said metal film comprises at least one material selected from the group consisting of aluminum, silver and gold.

26. The apparatus of claim 24 wherein said light beam comprises p-polarized laser light.

27. The apparatus of claim 24 further comprising at least one controllable light beam parameter selected from the group consisting of size, shape, intensity, modulation, and location.

28. The apparatus of claim 24 further comprising an excitation source for sensing changes in surface plasmon resonance parameters.

29. The apparatus of claim 28 wherein said excitation source further comprises a surface plasmon resonance probe.

30. The apparatus of claim 24 further comprising a position sensing detector for pump-probe and light-by-light sensing methods.

31. The apparatus of claim 24 wherein the film further comprises at least one of a hydrophobic region and a hydrophilic region.

32. The apparatus of claim 31 wherein the at least one of the hydrophobic region and the hydrophilic region further comprises nanometer-scale particles.

33. The apparatus of claim 24 wherein said fluid is sorted by at least one optical and liquid property selected from the group consisting of index of refraction, surface tension, viscosity, vaporization point, and contact angle.

34. The apparatus of claim 24 wherein said surface plasmons further comprise interference fringes.

35. The apparatus of claim 34 wherein said surface plasmons are disposed for nano-fluidic actuation.

36. The apparatus of claim 34 wherein said surface plasmon interference fringes are disposed in a two dimensional array.

37. The apparatus of claim 34 wherein said at least one light beam is disposed to transport fluid between said interference fringes.

38. The apparatus of claim 24 wherein said metal film further comprises at least one surface configuration selected from the group consisting of full-depth patterned holes, shallow patterned indentions, parallel lines, gratings, array of toroids, metal island film, and patterned and colloidal nanometer-scale particles.

39. The apparatus of claim 38 wherein said nanometer-scale particles are embedded in a sub-surface region.

40. A method for moving a fluid on a surface, the method comprising:

disposing a fluid on a surface of a metal film attached to a dispersive substrate;

impinging at least two programmable light beams on said metal film proximate said fluid, said light beams interfering to define an interference pattern on the metal film, the interference pattern creating surface plasmon interference fringes in said metal film; and separating the fluid into a pattern of droplets on the surface of the metal film, the pattern of droplets being defined by the interference fringes.

41. The method of claim 40 wherein said dispersive substrate is a dielectric medium.

42. The method of claim 40 wherein said metal film comprises at least one material selected from the group consisting of aluminum, silver, and gold.

43. The method of claim 40 wherein at least one of the light beams further comprise p-polarized laser light.

44. The method of claim 40 further comprising at least one controllable light beam parameter selected from the group consisting of size, shape, intensity, modulation, and location.

45. The method of claim 40 further comprising an excitation source for sensing changes in surface plasmon resonance parameters.

46. The method of claim 45 wherein said excitation source comprises a surface plasmon resonance probe.

47. The method of claim 40 further comprising a position sensing detector for pump-probe and light-by-light sensing methods.

48. The method of claim 40 wherein said film further comprises at least one of a hydrophobic region and a hydrophilic region.

49. The method of claim 48 wherein the at least one of the hydrophobic region and the hydrophilic regions further comprises nanometer-scale particles.

50. The method of claim 40 wherein said fluid is sorted by at least one optical and liquid property selected from the group consisting of index of refraction, surface tension, viscosity, vaporization point, and contact angle.

51. The method of claim 40 further comprising at least one optical fiber for sensing.

52. The method of claim 51 wherein said at least one optical fiber is capable of supporting surface plasmons for actuation.

53. The method of claim 40 wherein said surface plasmons are disposed for nano-fluidic actuation.

54. The method of claim 40 wherein said surface plasmon interference fringes are disposed in a two dimensional array.

55. The method of claim 40 wherein at least one additional light beam is disposed to transport fluid between said interference fringes.

56. The method of claim 40 wherein said metal film further comprises at least one surface configuration selected from the group consisting of full-depth patterned holes, shallow patterned indentions, parallel lines, gratings, array of toroids, metal island film, and patterned and colloidal nanometer-scale particles.

57. The method of claim 56 wherein said nanometer-scale particles are embedded in a sub-surface region.

58. A method for moving a fluid on a semiconductor surface, the method comprising:

disposing a fluid on a doped surface of a semiconductor, the doped surface comprising a dopant;

impinging a light beam on an interface between the doped surface and the fluid;

creating charge carriers in the doped surface to locally alter a surface charge density; and altering a surface tension of the fluid, thereby moving the fluid on the doped surface.

* * * * *